UNITED STATES PATENT OFFICE.

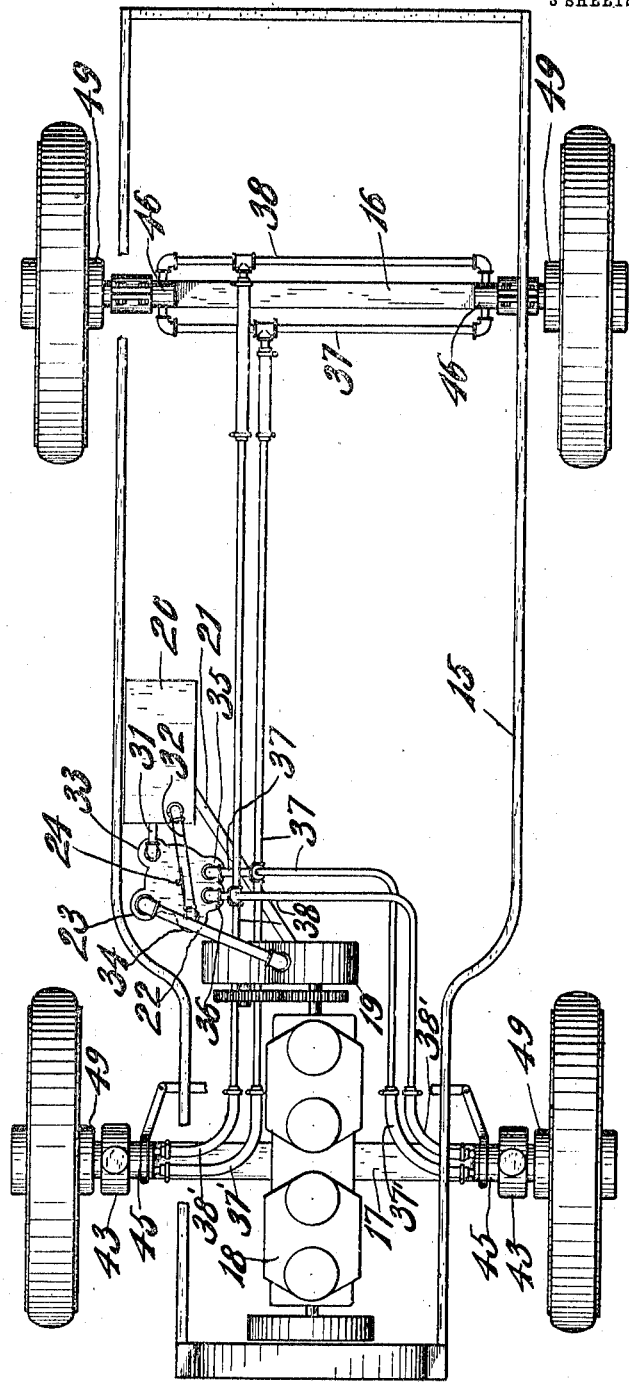

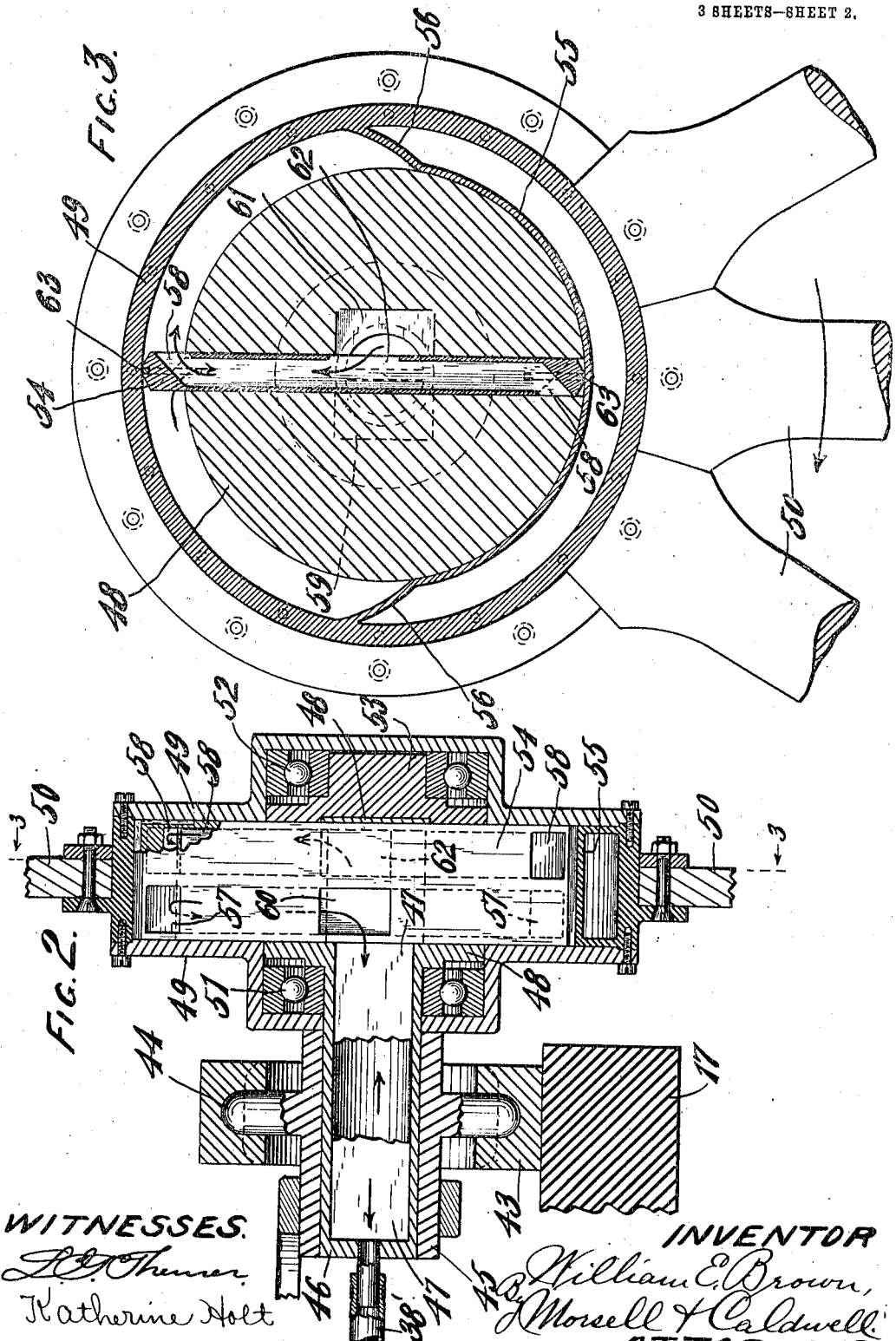

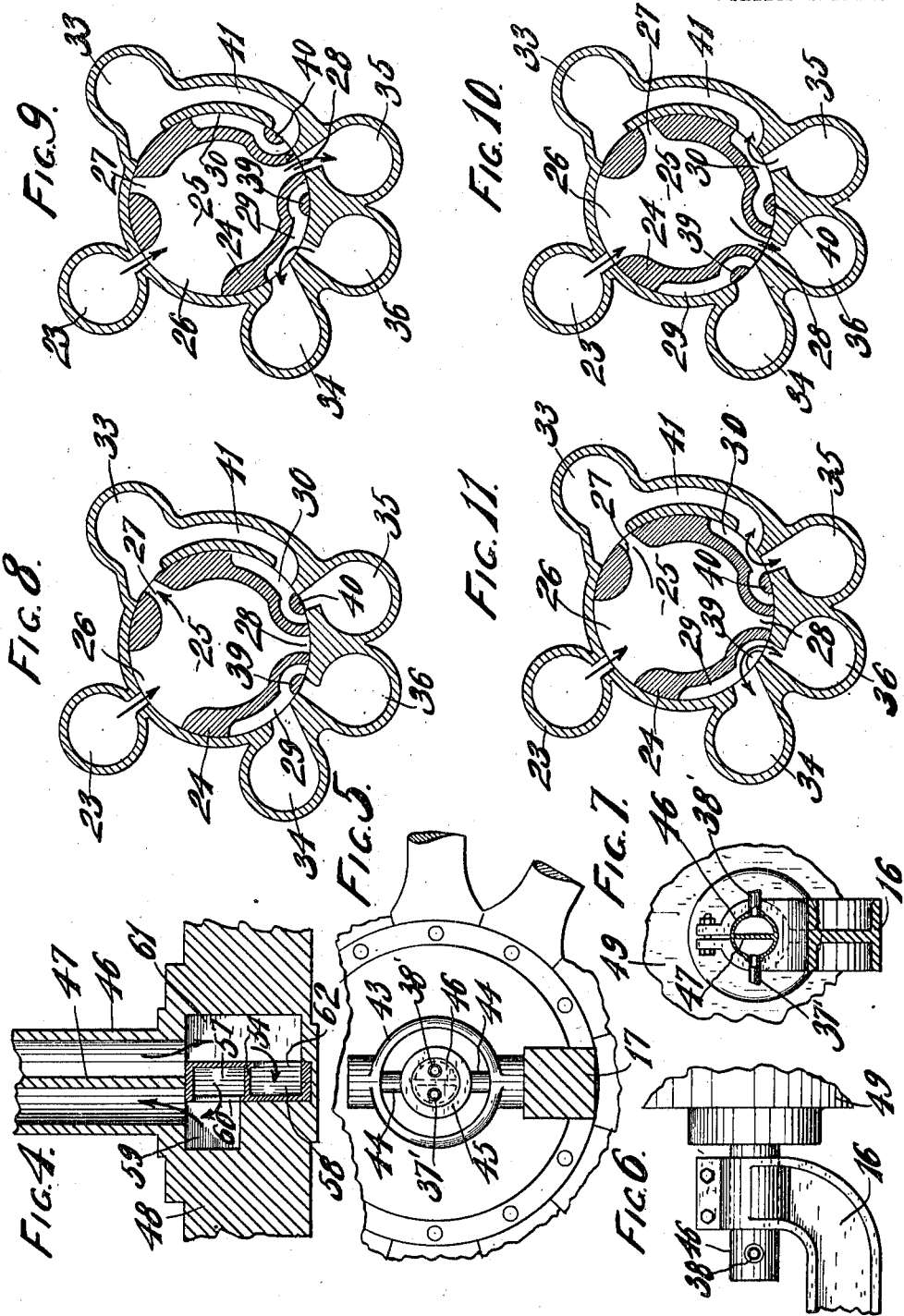

WILLIAM E. BROWN, OF MILWAUKEE, WISCONSIN, ASSIGNOR OF FIFTEEN ONE-HUN-
DREDTHS TO WILLIAM M. STEWART, OF MILWAUKEE, WISCONSIN.

TRANSMISSION MEANS.

1,099,161. Specification of Letters Patent. Patented June 9, 1914.

Application filed May 1, 1911, Serial No. 624,309. Renewed November 7, 1913. Serial No. 799,695.

*To all whom it may concern:*

Be it known that I, WILLIAM E. BROWN, a citizen of the United States, residing in Milwaukee, in the county of Milwaukee and State of Wisconsin, have invented new and useful Improvements in Transmission Means, of which the following is a description, reference being had to the accompanying drawings, which are a part of this specification.

This invention has for its object to provide power transmission means particularly adapted for motor vehicles, but capable of other uses, and consisting of a system for conducting oil or other liquid transmission medium from a pump to one or more motors, suitably located for giving the desired motion to the parts to be driven, and then returning such transmission medium to the pump.

Another object of this invention is to perfect details of construction of such a transmission system, whereby it may be adaptable for driving all four wheels of the motor vehicle and the operation and control thereof is facilitated.

With the above and other objects in view the invention consists of power transmission means herein claimed and all equivalents thereof.

Referring to the accompanying drawings in which like characters of reference indicate the same parts in the different views:

Figure 1 is a plan view of a transmission mechanism constructed in accordance with this invention and applied to an automobile; Fig. 2 is a transverse sectional view of one of the steering wheel motors, forming part thereof; Fig. 3 is a sectional view thereof on the plane of line 3—3 of Fig. 2; Fig. 4 is a horizontal view of the stationary member of the motor, showing the slide therein; Fig. 5 is an end elevation of the motor viewed from between the wheels; Fig. 6 is a detail view of the motor connection with the rear axle; Fig. 7 is a view at right-angles thereto showing the motor stud in section; Fig. 8 is a sectional view of the controlling valve in its position for preventing movement of the vehicle; Fig. 9 is a similar view of the controlling valve in its position for causing the vehicle to move forwardly; Fig. 10 is a similar view of the controlling valve in its position for causing the vehicle to move rearwardly; and, Fig. 11 is a similar view of the controlling valve in its position to permit the vehicle to coast.

In these drawings 15 indicates a vehicle frame having a fixed rear axle 16 and a fixed front axle 17 with a gasolene engine 18 or other motor mounted thereon and driving a gear pump 19 or some desirable form of mechanism for imparting motion to a liquid transmission medium.

A reservoir 20 containing the liquid transmission medium such as oil has a pipe connection 21 connecting it with the pump 19 and a pipe connection 22 conducts the oil from the pump to a port 23 of a controlling valve 24 which may be turned in its casing by the driver of the car in any suitable manner. The controlling valve 24, as clearly shown in Figs. 8, 9, 10 and 11, has a central cavity 25 with openings 26, 27 and 28 leading therefrom. This valve also has curved by-passes 29 and 30 on either side of the opening 28. There are two pipe connections, 31 and 32, leading from the valve casing to the reservoir, the former connecting with a port 33 and the latter with a port 34 of the valve casing. The other two ports of the controlling valve casing are a forward driving port 35 and a rearward driving port 36, the former having pipe connections 37 leading therefrom to each of the four motors of the vehicle and the latter having pipe connections 38 also leading to the four motors of the vehicle.

In order to describe the construction and operation of the controlling valve before describing the construction and operation of the motors it will be stated that when the controlling valve is in a position to connect the pump with the forward driving port 35 and thence through the pipe connections 37 to the motors, the motors are driven thereby in a direction to move the vehicle forwardly, the oil being returned to the valve by the pipe connections 38 and to the reservoir and the pump through said valve, while an opposite direction of flow of the oil will cause the motors to turn in a direction to drive the vehicle rearwardly. In the position of the valve shown in Fig. 8, the oil from the pump is free to pass from the port 23 to the port 33 leading to the reservoir without having access to either of the driving ports 35 and 36, both of the latter being closed by blocks 39 and 40 in the by-passes 29 and 30 respectively. The circulation of oil through the pipe system connecting with the motors is therefore stopped entirely so that the motors are incapable of turning and therefore act as brakes locking the vehicle in its standing position. The forward running position of the valve, as shown in Fig. 9 brings the opening 28 of the valve into register with port 35 so that the oil from the pump may flow from the pump port 23 to the forward driving port 35, while the returning oil from the port 36 is free to travel by means of the by-pass 29 to the reservoir port 34, the direct connection from the pump port 23 to the reservoir port 33 through the opening 27 having been closed. The rearward running position of the valve, as shown in Fig. 10, serves to connect the pump port 23 with the port 36 to cause the motors to turn backwardly and the returning oil therefrom is free to pass from port 35 to an extension 41 of reservoir port 33 by way of by-pass 30.

It will be noted that from the standing position of the valve, shown in Fig. 8, it receives a slight turn in one direction to produce the forward running position, of Fig. 9, or a slight turn in the opposite direction to produce the rearward running position, of Fig. 10, and intermediate of these two extreme positions and the normal or middle, standing, position of the valve it passes through what may be called coasting positions, in which the motors are not locked, but are free to turn, though not being driven by the pump. One of such positions of the valve is shown in Fig. 11, wherein the pump port 33 connects directly with the reservoir port 33 and both of the driving ports 35 and 36 are connected with the reservoir ports 33 and 34 respectively by means of the by-passes 30 and 29. Thus oil is free to travel in either direction through the conducting system and the pump will have no effect upon the motors.

It will be noted that under no conditions will the pump port 23 be deprived of communication with some outlet for the oil from the pump, the intention being to keep the pump running continuously while the machine is in use. When the oil does not have access to either the forward running port 35 or the rearward running port 36 it is free to return to the reservoir and variations in running speed may be produced by intermediate adjustments of the valve whereby a portion only of the oil from the pump port 23 passes to one of the driving ports while the remainder returns to the reservoir.

The steering knuckle for the front wheels of the vehicle is somewhat different from the ordinary, the stationary front axle 17 being provided with a ring 43 on top thereof at each end and said ring having loosely fitting therein the vertical trunnion projections 44 of a tubular sleeve 45. Within the sleeve 45 is fitted a tubular stud 46 which has a vertical partition 47 dividing it centrally and which is closed at its end except for connections with the pipes 37 and 38 by means of flexible hose connections 37' and 38', which communicate with the interior on opposite sides of the partition.

The tubular stud 46 extends from a cylindrical stationary head 48, best seen in Figs. 3 and 4, which is contained within a casing 49 forming the hub of the vehicle wheels and having the spokes 50 of said wheels bolted thereto. The casing 49 is preferably mounted on ball-bearings 51 located between it and the stud 46 and ball-bearings 52 located between it and a boss 53 which is removably secured on the head 48 opposite the stud 46. There is a vertical slot extending diametrically through the head 48 and from one side to the other thereof and within this slot is a slide 54 which is free to move endwise. The casing 49 is somewhat larger in diameter than the head 48, and one-half thereof contains a wall 55 closely fitting the head 48 with cam ends 56 connecting the two internal wall of the casing of different diameters. The length of the slide 54 is such that it will bear against the wall 55 as well as the inner surface of the wall of the casing directly opposite. The slide 54 has a pair of passage-ways 57 and 58 extending through it from end to end and arranged side by side, one of said passage-ways terminating in an opening on one face of the slide at one end thereof and in an opening on the other face of the slide at the other end thereof, and the two passage-ways are oppositely arranged, that is, at each end of the slide there is one passage-way opening on one face while the other passage-way opens on the other face. Communication is maintained between the passage-way 57 and the space in the stud 46 on one side of the partition 47 by means of a recess or cavity 59 in the head 48 connecting with said space and communicating with the passage-way through an opening 60 in the slide, while a somewhat larger cavity 61 establishes communication between the space of the stud 46 on the other side of partition 47 with the passage-way 58 by means of an opening 62 in the slide, and the length of the openings 60 and 62 is sufficient to maintain these connections during the movements of the slide.

Oil received from the pump under the pressure thereof from one set of pipe connections, according to the position of the controlling valve, will travel in the direction of the arrows of Fig. 2, 3 and 4, passing through the stud 46 on one side of the partition 47 and thence through the opening 62 through the passage-way 58 and out through one end of the slide 54 to the space between the head 48 and the casing 49 and between the cam 56 and the slide 54, where the pressure on the oil causes the casing to turn and enlarge said space to accommodate the incoming oil. The oil is prevented from passing between the slide and the casing by reason of a packing 63 around its edge. The oil which is in the space between the head 48 and the casing 49 is in the meantime afforded an outlet through the other passage-way 57 and thence through the opening 60 and the space of the stud 46 on the other side of partition 47 to the return pipe connections. It is obvious that a reversal in the direction of flow of the oil through the system will result in the reversal of direction of rotation of the motors. Upon the projecting end of the slide arriving at one of the cams 56 it is forced inwardly thereby, thus closing the ends of the passage-ways through which the oil has been flowing and simultaneously the other end of the slide is projected to uncover the ends of the passage-ways located there, so that the operation is continuous and automatic, all motors being governed alike by the operation of the controlling valve.

At the rear axle the motor construction is the same, but here there is no necessity for providing the knuckle joints and consequently the stud 46 is clamped directly on the end of the axle 16 and the pipe connections 37 and 38 are made therewith without the presence of flexible hose connections.

In operation the continuous pumping action on the oil is caused to propel the vehicle forwardly or rearwardly and at a greater or less speed by the manipulation of the controlling valve which serves to direct the flow of oil from the pump to one set of pipes or the other or to the reservoir, or by closing the communication for the pipe connections entirely serving to lock the wheels against rotation. The transmission is thus accomplished without the necessity for intermeshing gearing or frictional engagements with the usual objections incident thereto, and the change of speed or direction of movement is effected by the mere turning of a valve. With this construction also the driving power may be applied to all four wheels of the vehicle, thus insuring the maximum traction efficiency.

The motor construction is simple and durable and is effective for the purpose intended without interfering with the steering of the vehicle.

What I claim as new and desire to secure by Letters Patent is:

1. A transmission means, comprising a fluid operated motor, a pair of pipe connections connecting therewith, a controlling valve comprising a casing with a forward running port and a rearward running port connected respectively to the pipe connections, a reservoir, said controlling valve casing being provided with a pair of reservoir ports adjacent to the aforementioned ports and connected with the reservoir, a pump, said controlling valve casing being provided with a pump port connected with the pump, said controlling valve containing a chamber having three openings, one of which is adapted to register with the pump port while the second registers with one of the reservoir ports in one position of the valve, and also adapted to register with the pump port while the third opening registers with either the forward running port or the rearward running port in other positions of the valve, said valve also being provided with by-passes by means of which either of the running ports is connected with one of the reservoir ports when the other running port is connected with said third opening of the valve chamber, said valve being further provided with blocks for closing the running ports in the position of the valve in which the second opening thereof registers with the reservoir port, and a direct connection from the reservoir to the pump.

2. A fluid motor, comprising a stationary cylindrical head, a casing mounted to rotate thereon and fitting against the head at one portion of its interior while being spaced from the head at its opposite portion, a slide passing through the head and provided with a pair of passage-ways extending from one end thereof to the other and each opening at opposite faces of the slide at the respective ends thereof, and the openings of the two passage-ways being on opposite faces of the slide at each end thereof, said head having cavities near the center thereof on opposite sides of the slide and communicating with the respective passage-ways through openings in the slide, and means for delivering fluid under pressure to either of the cavities and for removing the same from the other cavity.

3. A pressure motor comprising a stationary cylindrical head, a tubular stud projecting therefrom, a partition in the tubular stud dividing it into separate passage-ways, means for supplying fluid pressure to one of the passage-ways, trunnions carried by the tubular stud, a support in which the trunnions are mounted to permit of pivotal movements of the head, a casing surrounding the head, ball-bearings between the casing and the head, said casing fitting the surface of the head at one portion thereof and being spaced from the head at the opposite portion thereof, cams connecting said portions of the casing, a slide passing through the head and fitting the walls of the casing and adapted to be engaged by the cams during the rotary movements of the casing and forced to slide through the head, said slide being provided with a pair of passage-ways extending from one end thereof to the other and each passage-way terminating in an opening on opposite faces of the slide at the opposite ends thereof and the two passage-ways having their openings on opposite faces of the side at each end of the slide said head being provided with cavities near its center on opposite sides of the slide communicating with the respective passage-ways of the slide through openings in the slide and also communicating with the passage-ways of the tubular stud.

4. In an automobile, a pressure motor, comprising a stationary cylindrical head, a tubular stud projecting therefrom, a partition in the tubular stud dividing it into separate passage-ways, means for supplying fluid pressure to one of the passage-ways, trunnions carried by the tubular stud, a support in which the trunnions are mounted to permit of pivotal movements of the head, a casing surrounding the head, ball-bearings between the casing and the head, said casing fitting the surface of the head at one portion thereof and being spaced from the head at the opposite portion thereof, cams connecting said portions of the casing, a slide passing through the head and fitting the walls of the casing and adapted to be engaged by the cams during the rotary movements of the casing and forced to slide through the head, said slide being provided with a pair of passage-ways extending from one end thereof to the other, and each passage-way terminating in an opening on opposite faces of the slide at the opposite ends thereof and the two passage ways having their openings on opposite faces of the slide at each end of the slide, said head being provided with cavities near its center on opposite sides of the slide communicating with the respective passage-ways of the slide through openings in the slide and also communicating with the passage-ways of the tubular stud, an axle on which the pivotal support for the tubular stud is mounted and a vehicle wheel formed around the casing as its hub with spokes secured thereto.

In testimony whereof, I affix my signature, in presence of two witnesses.

WILLIAM E. BROWN.

Witnesses:
 R. S. C. CALDWELL,
 KATHERINE HOLT.